(No Model.)

J. UNGVARY.
CAR FAN.

No. 581,969. Patented May 4, 1897.

Witnesses
R. H. Newman
Harriet Slason

Inventor
JOHN UNGVARY
By Chamberlain & Newman
his Attorneys

UNITED STATES PATENT OFFICE.

JOHN UNGVARY, OF SOUTH NORWALK, CONNECTICUT.

CAR-FAN.

SPECIFICATION forming part of Letters Patent No. 581,969, dated May 4, 1897.

Application filed December 17, 1896. Serial No. 615,974. (No model.)

*To all whom it may concern:*

Be it known that I, JOHN UNGVARY, a citizen of the United States, and a resident of South Norwalk, in the county of Fairfield and State of Connecticut, have invented certain new and useful Improvements in Fans, of which the following is a specification.

This invention relates to new and useful improvements in fans for butcher-wagons or like vehicles wherein it is desirable to create a circulation of air for the purpose of keeping the contents of the wagon cool and also to drive out flies and other objectionable insects.

It is the object of my invention to provide a fan as above specified, which shall be automatically operated by the rotation of the wheel of a wagon, and, further, to provide means whereby power may be accumulated for use at such times when the wagon is stopped for the purpose of serving customers.

Referring to the accompanying drawings, which form a part of this specification, the same letters of reference denote like or corresponding parts upon both figures, and of which—

Figure 1:
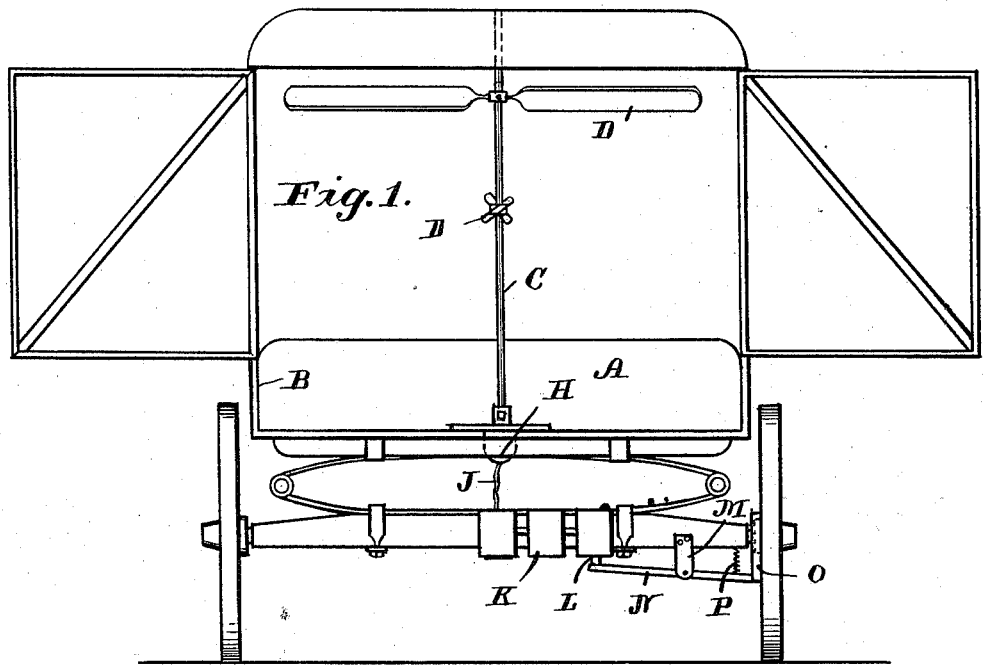
Figure 2:
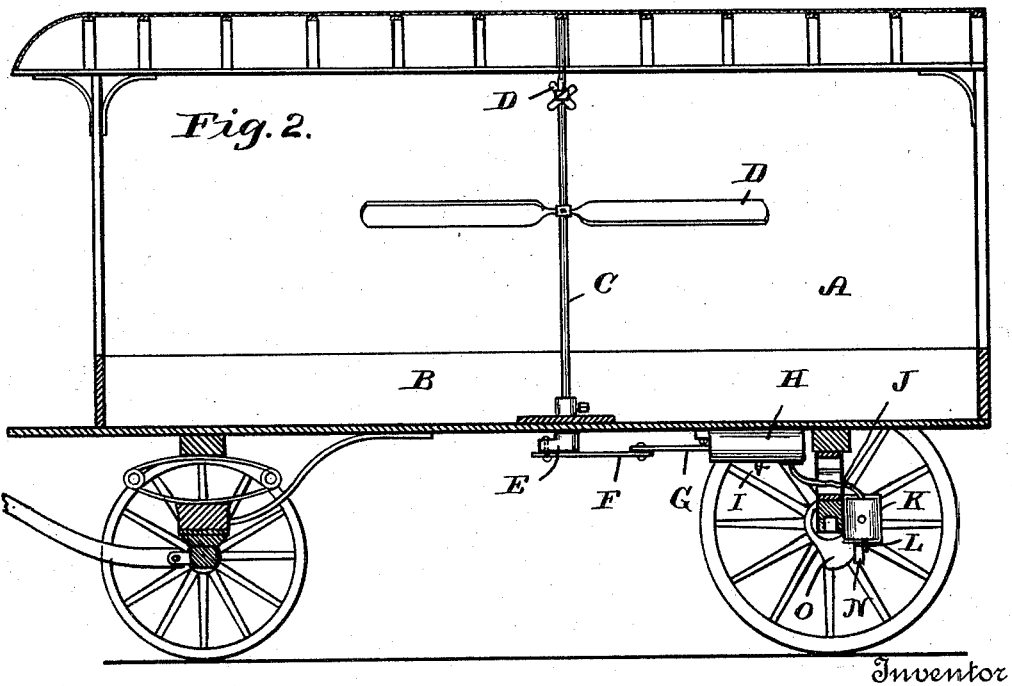

Figure 1 shows a rear elevation of my meat-wagon provided with my novel driving mechanism. Fig. 2 shows a central vertical longitudinal section of the wagon and the mechanism mounted thereon.

Referring to the characters marked upon the drawings, A indicates the wagon, B the body thereof, and C a vertical shaft journaled within the base of the body and the top of the cover. Said shaft is provided with two series of fans D D, which are secured to said shaft and designed to rotate therewith. The lower end of said shaft C is provided with a crank E, which in turn has a link connection F with a piston G of a compressed-air cylinder H.

The air-cylinder H is secured to the under side of the wagon-body B and is provided with a safety-valve I, by means of which the supply of air is limited. J indicates a flexible pipe connecting said cylinder, with the reservoir K, to the rear axle of the running-gear. The reservoir K, as will be observed, consists in a series of cylinders, any number of which may be employed, said cylinders being connected together by means of couplings, as shown. To one of these cylinders I connect an air-pump H, which may be of any ordinary or well-known type.

I secure a block M to the axle adjacent to the reservoir before mentioned and pivot thereto a spring-actuated lever N, the inner end of which is connected to and operates the pump L, while the outer end is engaged and operated by the cam O, secured to the inside of the hub of the rear wheel. It will thus be obvious that by the rotation of the wheel above mentioned the lever will be operated against the action of the spring P, connected to the outer end thereof, and thus operate the pump in a manner to force air therein.

With the above construction it will be apparent that by the movement of the wagon and the rotation of its rear wheel the connection thereof with the pump of the reservoir will cause the former to operate in a manner to fill said reservoir, and that by means of said supply of compressed air the cylinder H, before mentioned, will operate in a manner to rotate the shaft C and thus drive the fan contained thereon.

Having thus described my invention, what I claim, and desire to secure by Letters Patent, is—

In a butcher-wagon of the class described, the combination of the vertical shaft having fans thereon and a crank upon its lower extremity, link F connecting it with a piston of an air-cylinder, reservoirs adjacent to and connected with said air-cylinder, a pump L for filling said reservoirs, a cam upon the wheel of the wagon having operative connections with said pump whereby the latter is operated by the movement of the wheel, substantially as described.

Signed at Bridgeport, in the county of Fairfield and State of Connecticut, this 22d day of September, A. D. 1896.

JOHN UNGVARY.

Witnesses:
 ELBERT O. HULL,
 HARRIET LLASON.